(No Model.)
T. C. GREENE.
THILL COUPLING.
No. 468,245. Patented Feb. 2, 1892.
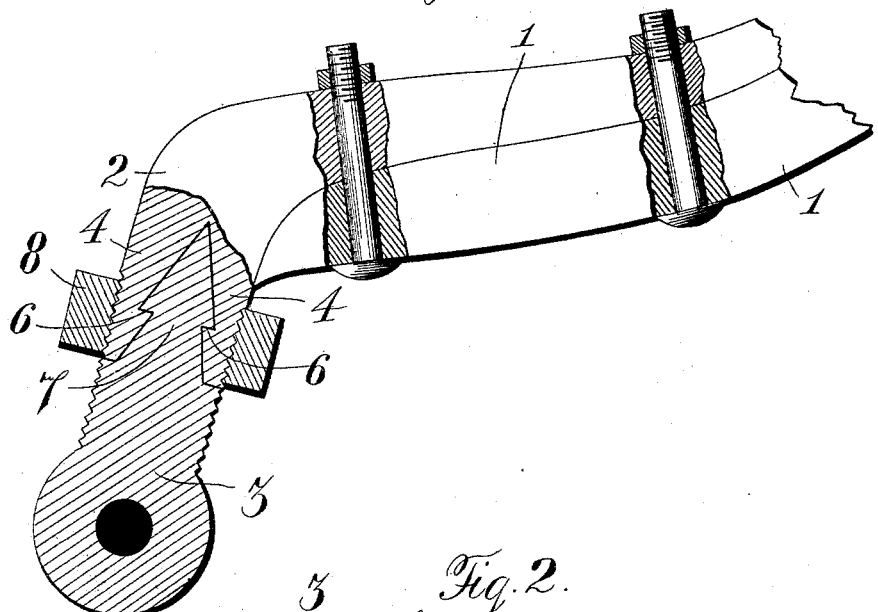
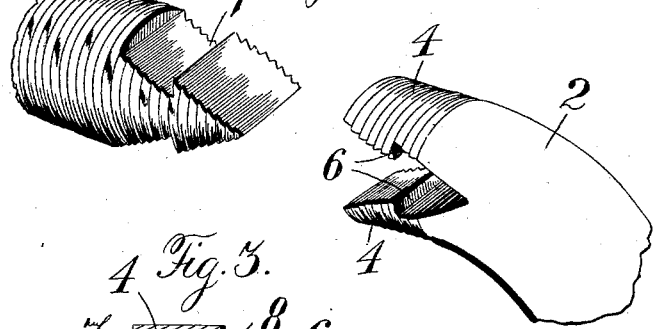
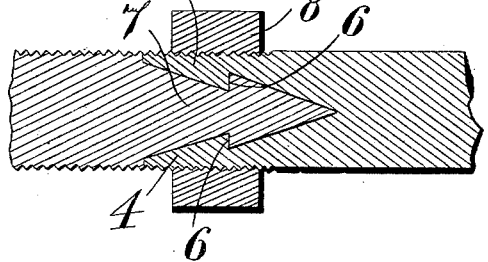
Witnesses:
Jas. E. Hutchinson
Dennis Sumby
Inventor
Thomas C. Greene,
By James L. Norris
Attorney.

UNITED STATES PATENT OFFICE.

THOMAS C. GREENE, OF LIBERTY, INDIANA, ASSIGNOR OF ONE-HALF TO WINFIELD T. BOWERS, OF SAME PLACE.

THILL-COUPLING.

SPECIFICATION forming part of Letters Patent No. 468,245, dated February 2, 1892.

Application filed March 28, 1891. Serial No. 386,739. (No model.)

*To all whom it may concern:*

Be it known that I, THOMAS C. GREENE, a citizen of the United States, residing at Liberty, in the county of Union and State of Indiana, have invented new and useful Improvements in Couplings for Thills, Shafting, &c., of which the following is a specification.

This invention relates to an improved coupling adapted for attaching the thills of vehicles and also for detachably connecting the several sections of a line of power-shafting and for other purposes.

My invention consists in a coupling composed of two interlocking and externally-screw-threaded parts, one of which is provided with a double-V-shaped bifurcated end having internal transverse shoulders intermediate the ends of the bifurcation, the other interlocking part being provided with an externally-shouldered double-inclined wedge-shaped projection to engage said internally-shouldered bifurcation, the said projection and bifurcation having external screw-threads continuous with the screw-threaded surfaces of the main parts, and a nut to engage said threaded surfaces, as hereinafter more fully set forth.

In the annexed drawings, illustrating the invention, Figure 1 is a sectional view of a thill-coupling embodying my improvement. Fig. 2 is a view of the separate parts of my improved coupling. Fig. 3 is a view of the coupling as applied for detachably connecting the adjacent sections of a line of shafting.

Referring to the drawings, the numeral 1, Fig. 1, designates the rear portion of a thill or vehicle shaft to which is secured in any suitable manner a metal shank 2, that forms one part of the coupling. The other part 3 of the coupling is mounted on the vehicle-axle in any convenient manner. One of these parts—as for instance, the shank 2—is provided with a bifurcated end composed of the dovetail arms or branches 4, that are formed with internal shoulders 6 to engage corresponding external shoulders on a double-inclined wedge-shaped projection 7, that is formed on the end of the other part 3 of the coupling. These dovetailed interlocking ends of the parts 2 and 3, are engaged and disengaged laterally or by slipping one of said parts sidewise onto or off from the other. It will be observed that the double-wedge-shaped projection 7 of one part or member is formed with a sharpened end that facilitates its engagement in the double-V-shaped and internally-shouldered bifurcation of the other part or member. The ends of the parts 2 and 3 are externally screw-threaded, as shown, for engagement with a nut 8, and when the shouldered or dovetailed arms 4 and wedge-shaped projection 7 are engaged or interlocked the said nut is moved forward until it encircles the dovetailed connection and thereby prevents any lateral displacement. By this mode of coupling the parts can be firmly and rigidly secured, so as to be held together without liability of either lateral or endwise disconnection, and yet permit said parts to be rigidly detached when desired.

In employing this coupling as a means for detachably connecting the several sections of a line of shafting, as shown in Fig. 3, or for other purposes, no change is required except such as may be incident to the form and dimensions of the parts to be united.

For the purpose of disconnecting the coupled parts it is only necessary to move the nut 8 off from the dovetailed connection and then shift one of the parts 2 or 3 in a lateral direction, while by reversing this operation the parts may be again quickly and firmly connected.

I am aware of the patents to Morse, No. 109,927, and Pelzer, No. 294,903, and do not claim the construction shown therein. My invention differs from these and from other couplings of which I am aware in comprising the externally-shouldered double-inclined wedge-shaped projection 7 of one part engaged in the bifurcated end 4 of the other part, which bifurcation is formed with internal double-inclined surfaces having shoulders 6 intermediate their ends to interlock with the corresponding external shoulders on the said wedge-shaped projection, whereby a firm and rigid connection is secured without any liability of endwise displacement. Neither do I claim the construction shown in Patent No. 420,748 to Tefft, nor No. 441,279 to Campbell.

What I claim as my invention is—

The combination, in a coupling, of the cylindrical externally-screw-threaded part 3, having a sharpened double-wedge-shaped projection 7, provided with shoulders on opposite sides, the cylindrical externally-screw-threaded part 2, provided with a double-V-shaped bifurcated end 4, having internal transverse shoulders 6 intermediate the ends of the bifurcation to interlock with the corresponding shoulders of said double-wedge-shaped projection, and the nut 8 to engage the threaded surfaces of said parts, substantially as shown and described.

In testimony whereof I have hereunto set my hand and affixed my seal in presence of two subscribing witnesses.

THOMAS C. GREENE. [L. S.]

Witnesses:
G. PIGMAN,
W. P. NORRIS.